Figure 1:
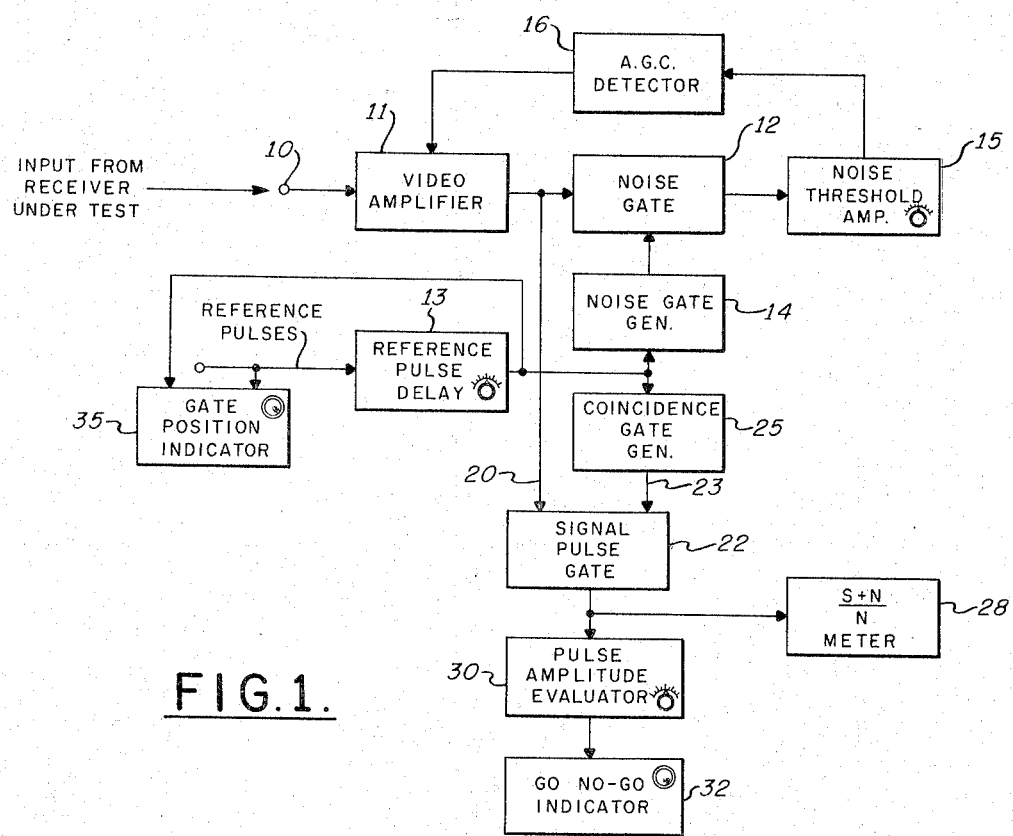

Jan. 31, 1967  W. R. FREE  3,302,116
SIGNAL PLUS NOISE TO NOISE MEASURING EQUIPMENT
Filed May 16, 1963

INVENTOR.
WILLIAM R. FREE
BY
*John H. Gallagher*
ATTORNEY

United States Patent Office 3,302,116
Patented Jan. 31, 1967

3,302,116
SIGNAL PLUS NOISE TO NOISE MEASURING EQUIPMENT
William R. Free, Clearwater, Fla., assignor to Sperry Rand Corporation, Great Neck, N.Y., a corporation of Delaware
Filed May 16, 1963, Ser. No. 280,939
8 Claims. (Cl. 325—363)

This invention relates to test equipment that automatically determines the signal plus noise-to-noise ratio of a detected pulsed signal in electronic equipment.

In the testing and adjustment of pulsed radar and communications systems, for example, it is desirable to know as accurately as possible the minimum level of a received signal that will cause the equipment to function in its desired manner and/or the minimum level of a signal that will permit an intelligible interpretation of the signals received by the system. The capability of a radar or communications receiver in this regard is referred to as its sensitivity. As this relates to a pulsed radar system, the sensitivity of the system is a measure of the minimum signal level of a received signal that is discernible above the noise. In the past, the measurement of the minimum sensitivity of a system was made by coupling test signals of varying amplitudes into the system and observing the response of the system on an oscilloscope. The determination of when a signal is discernible above the noise in the system is dependent upon the training, experience, and visual capabilities of the person making the observations, and it has been found that the qualifications and capabilities of radar operators vary considerably, and may vary within an individual. For these reasons it has been virtually impossible to obtain reliable and repeatable signal to noise evaluations on any given system, or to obtain reliable evaluations that will permit comparisons between systems at the same or at different locations.

It also is necessary that the transmitting equipment of pulsed radar and communications systems transmit signals having desired signal to noise ratios in order to achieve maximum utilization of the system capabilities.

For these and various other reasons it is desirable to have simple equipment that can readily make signal plus noise-to-noise ($S+N/N$) measurements in a manner that eliminates the need for subjective interpretation and determination by individual operators.

In the past, noise figure measurements have been made by monitoring the noise in a system in the absence of any signal input, and then connecting a calibrated noise source to the system and then increasing the noise until it is double the previous measurement. At this point the reading of the calibrated noise source is an indication of the noise in the system in the absence of an input signal. The shortcoming of this type of noise measurement is that it does not include the external noise that would be included with a received signal due to atmospheric noise, ground clutter and other electromagnetic radiations.

It therefore is an object of this invention to provide simple and reliable test apparatus for obtaining a signal plus noise-to-noise measurement in a pulsed electromagnetic wave radiation system.

Another object is to obtain automatically and without the necessity for subjective interpretation a signal plus noise-to-noise measurement in an electronic system responsive to pulsed signals.

A further object of this invention is to make noise related measurements in an electronic system that is receiving desired information signals.

Figure 2:
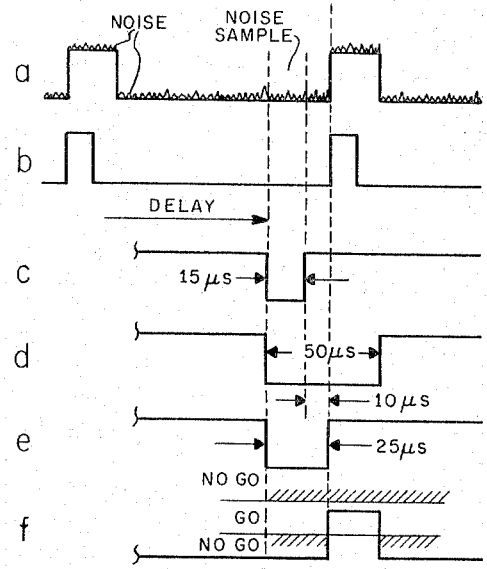

The present invention will be described by referring to accompanying drawings wherein:

FIG. 1 is a block diagram of the electrical test equipment of this invention that provides indications of the signal plus noise-to-noise ratio that is present in the pulsed input signal of an electronic system; and FIG. 2 is a series of waveforms used to help explain the operation of the test equipment illustrated in FIG. 1.

Referring now in detail to the drawings, the input terminal 10 of video amplifier 11 receives the signals upon which the measurements are to be made. As an example for this discussion, the input signal may be the video signal that is coupled from the receiver of a pulsed radar system. This signal is illustrated in FIG. 2a and includes spaced unidirectional pulses that represent returned echo signals and continuous random noise. This noise may result from noise generated both in the transmitting and receiving portions of the system, and from external sources such as the atmosphere, from ground clutter, and from other interfering electromagnetic radiations, both unintentional and intentional.

A normally-closed noise gate 12 is coupled to the output of video amplifier 11 and functions to sample the noise during a microsecond period occurring approximately 10 microseconds prior to each received pulse of the input signal. Noise gate 12 operates in response to reference pulses, FIG. 2b, that occur in synchronism with the incoming received pulses, and these reference pulses are delayed by means of pulse delay means 13 so that each delayed reference pulse commences approximately 25 microseconds prior to the occurrence of the next input pulse received on input terminal 10. Noise gate generator 14 operates in response to the delayed reference pulses to produce corresponding pulses that have a 15 microsecond delay, as illustrated in FIG. 2c. The pulses from noise gate generator 14 control noise gate 12 so as to sample the noise content of the received electromagnetic energy immediately prior to the occurrence of each received pulse. The segments of sampled noise, free of the received pulses, are amplified in noise threshold amplifier 15 and are coupled to automatic gain control detector 16 which includes an integrator type circuit that produces a D.C. automatic gain control bias signal that is coupled back to video amplifier 11 to continuously control the gain of that amplifier as a function of received noise. Therefore, the gain of video amplifier 11 is inversely proportional to the noise content of the video signal from the radar receiver and may be expressed as ($K$ $1/N$), where K is the gain of the amplifier in the absence of feedback and N is the noise signal.

The received signals of FIG. 2a couple through the noise controlled video amplifier 11 and the received signal pulses at the output of amplifier 11 now have an amplitude that may be expressed as $K(S+N/N)$, where ($S+N$) represents the amplitude of the signal pulses with the noise riding on top.

The output signal of video amplifier 11 thus is a measure of the $S+N/N$ ratio, and this output signal is coupled over lead 20 to signal pulse gate 22 which is a coincidence-type gate that passes the received pulses on lead 20 only when a coincidence pulse also is present on the other input lead 23. The coincidence pulses, FIG. 2d, are produced in coincidence gate generator 25 which in turn receives the delayed reference pulses, FIG. 2c, from reference pulse delay means 13. The coincidence gate pulses of FIG. 2d commence approximately 25 microseconds before the occurrence of a received signal pulse, FIG. 2a, and extend in time slightly beyond the conclusion of the received signal pulse in order to assure coincidence with the received signal pulse. Therefore, signal pulse gate 22 passes only the received signal pulses with the noise riding on top, and rejects noise at all other times.

The gated signal pulses from gate 22 then are coupled to $S+N/N$ meter 28 which contains the required meter circuitry and indicator to give a direct reading of the $S+N/N$ ratio of the received signals. The value of the noise (N) may be accurately determined from the parameters and characteristics of the A.G.C. feedback loop that establishes the feedback bias for video amplifier 11.

The gated received signal pulses also are coupled from signal pulse gate 22 to pulse amplitude evaluator 30 which passes a signal pulse only when its amplitude is above, or within selectable limits, as illustrated in FIG. 2f. The pulses that pass evaluator circuit 30 are coupled to a GO NO-GO indicator circuit 32 which may give a visual indication by means of light bulbs or a suitable type of recorder to indicate that the received signal pulses have a certain selectable $S+N/N$ ratio. It will be apparent that with the use of pulse amplitude evaluator circuit 30 and the GO NO-GO indicator 32 in conjunction with the calibrated meter of circuit 28 an operator of the test equipment can establish a minimum or some standard $S+N/N$ ratio for the received pulses, and an automatic evaluation of the signal pulses will be provided. Thus the subjective evaluation of the human operator is eliminated.

In some type of testing and evaluating equipment it may be desirable to provide an electrical signal that indicates when the received signal pulses do or do not fall above or within the limits set in pulse amplitude evaluator circuit 30. This function may be included in the GO NO-GO indicator 32 and the electrical signal may be provided on output line 33.

To assure the correct positioning of the noise gate pulses of FIG. 2c relative to the received signal pulses of FIG. 2a, a gate position indicator circuit 35 is provided. The delayed reference pulses, FIG. 2c, from the output of delay means 13 are coupled as one input to gate position indicator circuit 35 and cause said indicator circuit to internally generate a 25 microsecond pulse, as illustrated in waveform of FIG. 2e. This 25 microsecond pulse and the undelayed reference pulse of FIG. 2b are compared in time in a coincidence circuit to assure the relationship illustrated in FIG. 2. Indicator circuit 33 provides a visual indication when the trailing edge of the pulse of waveform 2e just becomes coincident with the leading edge of the reference pulse of FIG. 2b. By means of the delay adjustment knob on reference pulse delay means 13 the delay of the reference pulses is adjusted until the indicator light bulb in gate position indicator just flickers, thus indicating correct alignment of the noise gate pulses relative to the input signal pulses so as to sample the noise at the desired time period just prior to the occurrences of the signal pulses.

It will be obvious to those skilled in the art that the basic apparatus illustrated in FIG. 1 may be used for other types of testing and evaluating functions if desired.

The particular circuitry within the individual blocks of FIG. 1 all may be standard types of circuits to perform the respective well known functions and are known by those skilled in the art.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. Apparatus for making signal plus noise-to-noise measurements in electronic equipment having a pulsed input signal, said apparatus comprising, a controllable-gain amplifying circuit adapted to receive a pulsed input signal that occurs in the presence of noise, sampling means coupled to said amplifying circuit for sampling the noise during a short time period immediately adjacent the time of occurrence of each signal pulse, means coupled to said sampling means for deriving a D.C. bias signal proportional to the magnitude of said sampled noise, means responsive to said bias signal for controlling the gain of said amplifying circuit as an inverse function of said bias signal, whereby the output of said amplifying circuit is an inverse function of the sampled noise, gating means coupled to receive output signals from said amplifying circuit and operative to pass said output signals only during the occurrence of the pulses of said input signal, and pulse detecting means coupled to said gating means for deriving a detected signal whose magnitude is proportional to the magnitude of the gated pulsed signals passed by said gating means.

2. The combination claimed in claim 1 and further including means responsive to said detected signal for providing a visual indication of the magnitude of said gated pulsed signals.

3. The combination claimed in claim 1 and further including, signal evaluating means coupled to receive said gated signal pulses and operating to pass only the gated signal pulses whose magnitude fall within a predetermined range of magnitudes.

4. Electronic test equipment for making signal plus noise-to-noise measurements of desired pulse signals that occur in the presence of noise, said apparatus comprising, a controllable-gain amplifier adapted to receive said desired pulse signals, variable delay means for producing a series of delayed pulses having a time relationship to said desired pulse signals so that each delayed pulse occurs in a time period immediately prior to the time of occurrence of a corresponding desired pulse signal, noise gating means responsive to said delayed pulses for gating samples of said noise during the time periods immediately prior to each of said pulse signals, an automatic gain control loop responsive to said samples of noise and including noise integrating means for deriving a D.C. signal to control the gain of said amplfier as an inverse function of the magnitude of said sampled noise, means responsive to pulses from said delay means for producing a series of coincidence pulses that occur in substantial synchronism with said pulse signals, pulse signal gating means responsive to the pulse signals from said amplifier and responsive to said coincidence pulses for passing substantially only said pulse signals and blocking the noise that occurs during the time interval between said pulse signals, pulse amplitude responsive means coupled to said pulse signal gating means for determining the magnitude of said passed pulse signals.

5. Electronic test equipment for making signal plus noise-to-noise measurements of desired pulse signals that occur in the presence of noise, said apparatus comprising, a controllable-gain amplifier adapted to receive said desired pulse signals occurring in the presence of said noise, reference pulse means for producing a first series of gating pulses that occur in substantial coincidence with said desired pulse signals, variable delay means coupled to said reference pulse means for producing a second series of gating pulses having a time relationship to said desired pulse signals so that each of said second gating pulses occurs in a time interval immediately adjacent the time of occurrence of a corresponding desired pulse signal, noise gating means responsive to said second series of pulses and coupled to the output of said amplifier for deriving samples of said noise during said time intervals immediately adjacent each desired pulse signal, noise detector means responsive to said samples of noise for deriving a D.C. amplifier biasing signal to control the gain of said amplifier as an inverse function of said sampled noise, signal pulse gating means responsive to said first series of pulses and coupled to receive the output of said amplifier for passing only said pulse signals and noise occurring during the occurrences of said pulse signals and for blocking the noise occurring in the time interval between said pulse signals, whereby the magnitude of said pulse signals passed by said signal pulse gating means is proportional to the ratio $S+N/N$, wherein S represents the signal strength of said desired pulse signals and N represents the signal strength of said sampled noise.

6. The combination claimed in claim 5 and further including meter circuit and indicator means coupled to receive the output of said pulse signal gating means and operable to produce a meter reading indicating the $S+N/N$ ratio of the input signal to said amplifier.

7. The combination claimed in claim 5 and further including signal evaluator means coupled to receive the output of said pulse signal gating means for passing only pulse signals having magnitudes falling within selectable limits.

8. The combination claimed in claim 5 wherein the delay means produces pulses for said second series of pulses that terminate a short, fixed-time interval prior to the occurrence of the pulses of said desired pulse signals, and wherein said test equipment further includes, pulse generating means coupled to the output of said delay means and responsive to the leading edges of the pulses of said second series of pulses for producing corresponding alignment pulses having a fixed time period equal to the desired time period between the commencement of a pulse of said second series and the commencement of the respective immediately succeeding desired pulse signal, and pulse coincidence indicating means coupled to receive said first series of pulses and said alignment pulses for producing an output signal whenever the pulses of said first series of pulses and said alignment pulses coincide.

No references cited.

KATHLEEN H. CLAFFY, *Primary Examiner.*

R. LINN, *Assistant Examiner.*